United States Patent
Kuwabara et al.

(10) Patent No.: US 9,505,283 B2
(45) Date of Patent: Nov. 29, 2016

(54) INDEPENDENT SUSPENSION SYSTEM OF DRIVE WHEEL

(71) Applicant: HONDA MOTOR CO., LTD., Tokyo (JP)

(72) Inventors: Naoki Kuwabara, Wako (JP); Koshi Hayakawa, Wako (JP); Hajime Uchiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/845,497

(22) Filed: Sep. 4, 2015

(65) Prior Publication Data
US 2016/0089945 A1    Mar. 31, 2016

(30) Foreign Application Priority Data
Sep. 26, 2014    (JP) .................... 2014-196639

(51) Int. Cl.
*B60G 7/00* (2006.01)
*B60G 3/20* (2006.01)

(52) U.S. Cl.
CPC ........... *B60G 7/001* (2013.01); *B60G 3/20* (2013.01); *B60G 2200/144* (2013.01); *B60G 2204/129* (2013.01)

(58) Field of Classification Search
CPC .... B60G 7/001; B60G 3/22; B60G 2204/43; B60G 2200/144; B60G 2204/129; B60G 2200/17; B60G 2204/15
See application file for complete search history.

(56) References Cited

U.S. PATENT DOCUMENTS

| | | | | |
|---|---|---|---|---|
| 3,941,677 A * | 3/1976 | Bourne | ................. | C02F 1/4672 204/269 |
| 5,662,348 A * | 9/1997 | Kusama | ................. | B60G 7/001 280/124.134 |
| 5,896,941 A * | 4/1999 | Kajiwara | ................. | B60G 3/20 180/253 |
| 7,650,959 B2 * | 1/2010 | Kato | ................. | B60G 7/02 180/208 |
| 7,661,689 B2 * | 2/2010 | Kinugasa | ................. | B60G 3/20 280/124.134 |
| 7,770,907 B2 * | 8/2010 | Shimizu | ................. | B60G 3/20 280/124.134 |
| 7,934,735 B2 * | 5/2011 | Kuwabara | ............. | B60G 7/001 280/124.1 |
| 8,414,002 B2 * | 4/2013 | Yu | ................. | B60G 7/001 280/124.134 |
| 2001/0028156 A1 * | 10/2001 | Handa | ................. | B60G 3/20 280/93.512 |
| 2011/0285102 A1 * | 11/2011 | Yu | ................. | B60G 7/001 280/124.134 |
| 2012/0018973 A1 * | 1/2012 | Fujii | ................. | B60G 3/20 280/124.134 |
| 2015/0061274 A1 * | 3/2015 | Oshima | ................. | B60G 7/001 280/788 |

FOREIGN PATENT DOCUMENTS

JP    2006-103378    4/2006

* cited by examiner

*Primary Examiner* — Darlene P Condra
(74) *Attorney, Agent, or Firm* — Rankin, Hill & Clark LLP

(57) ABSTRACT

A lower arm has a first arm main part having a U-shape and a first vehicle-body-side front joint and a first vehicle-body-side rear joint provided at the tip parts of the first arm main part. An upper arm has a second arm main part having a U-shape and a second vehicle-body-side front joint and a second vehicle-body-side rear joint provided at the tip parts of the second arm main part. At least part of the second vehicle-body-side rear joint is overlapped with the first vehicle-body-side rear joint in plan view. The second vehicle-body-side front joint is offset to the rear side relative to the first vehicle-body-side front joint. A cushion unit disposed on the front side of the second arm main part is provided between a vehicle body frame F and the lower arm.

11 Claims, 7 Drawing Sheets

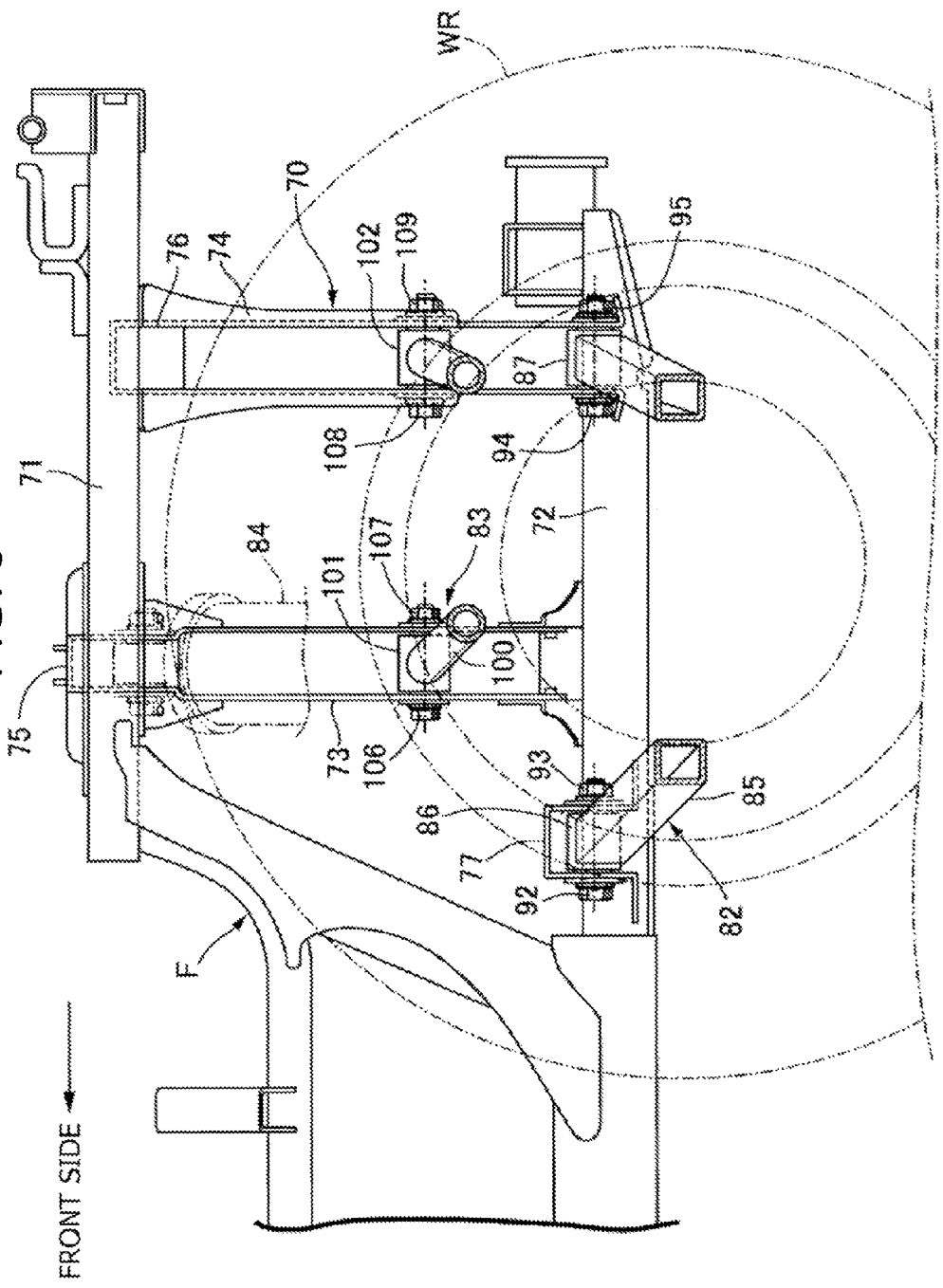

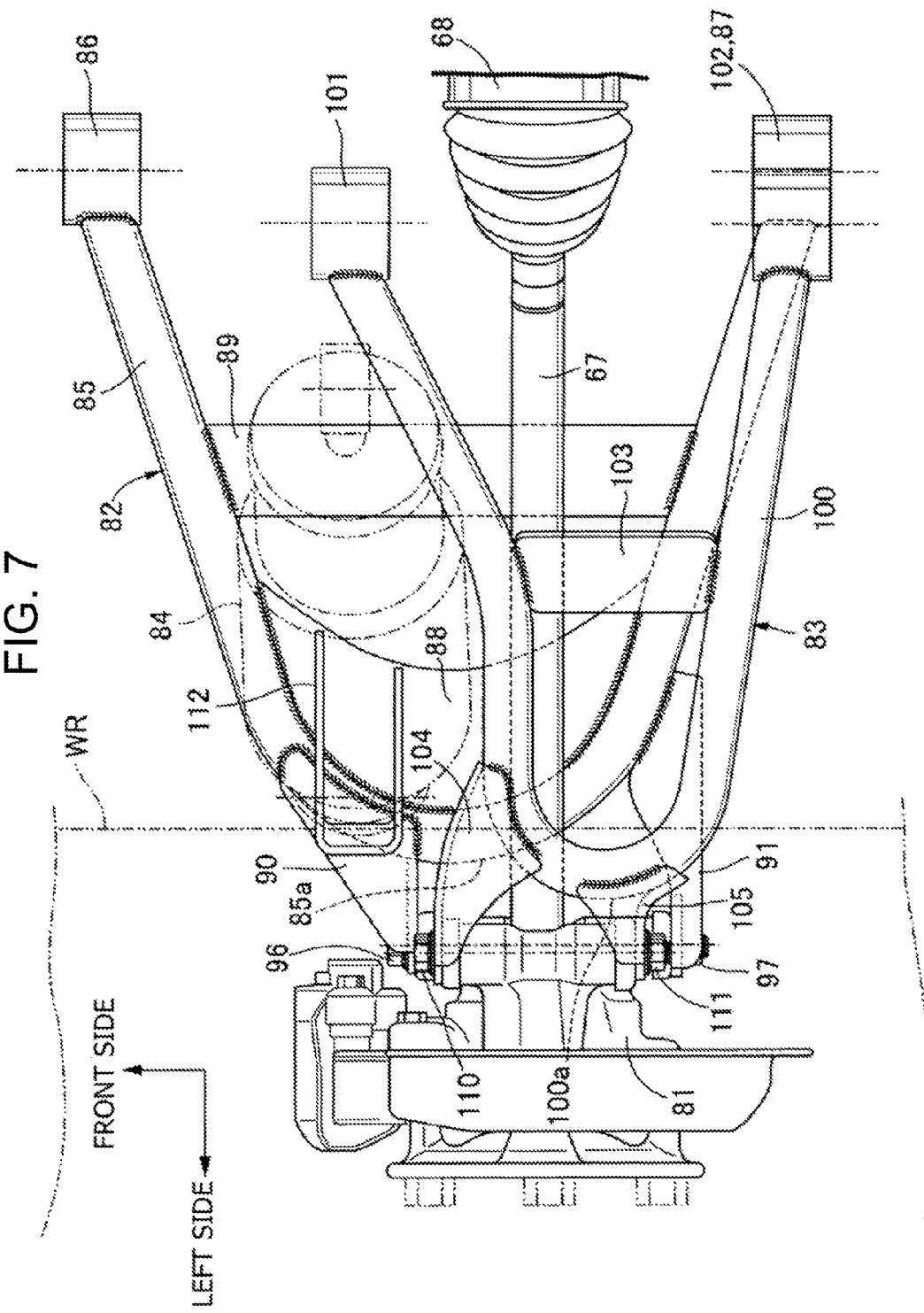

INDEPENDENT SUSPENSION SYSTEM OF DRIVE WHEEL

BACKGROUND OF THE INVENTION

Field of the Invention

The present invention relates to an independent suspension system of a drive wheel in which the drive wheel is vertically swingably supported by a vehicle body frame via a lower arm, an upper arm disposed over the lower arm, and a cushion unit, which is provided between the vehicle body frame and the lower arm.

Description of Related Art

Such an independent suspension system is generally already known, as shown by Japanese Patent No. 4467054.

However, in the system disclosed in the above Japanese Patent No. 4467054, a lower arm is configured to have a pair of arm parts having base end parts swingably supported by a vehicle body frame at positions separate from each other in the front-rear direction. Furthermore, an upper arm is composed of an arm member having a base end part swingably supported by the vehicle body frame and an upper sub-arm swingably joined to a tip part of the arm member. Moreover, a cushion unit is provided between the front arm part in the pair of arm parts of the lower arm and the vehicle body frame. Thus, not only a complicated structure but also increase in the weight is caused. In addition, the space for disposing the cushion unit is comparatively large.

SUMMARY OF THE INVENTION

The present invention is made in view of such circumstances and an object thereof is to provide an independent suspension system of a drive wheel allowing the placement space of a cushion unit to be easily ensured while achieving structure simplification and weight reduction.

In accordance with the present invention, an independent suspension system of a drive wheel is provided in which the drive wheel is vertically swingably supported by a vehicle body frame with an intermediary of a lower arm and an upper arm disposed over the lower arm and a cushion unit, which is provided between the vehicle body frame and the lower arm. The lower arm has a first arm main part that bends into a U-shape in plan view with a first curvature peak oriented toward the drive wheel and has a closed section as a cross-sectional shape. The lower arm has a first vehicle-body-side front joint and a first vehicle-body-side rear joint provided at tip parts of the first arm main part so as to be swingably joined to the vehicle body frame at positions separate from each other in front-rear direction, and is swingably joined to a knuckle that pivotally supports the drive wheel. Furthermore, the upper arm has a second arm main part that bends into a U-shape in plan view with a second curvature peak oriented toward the drive wheel and has a closed section as a cross-sectional shape. The upper arm has a second vehicle-body-side front joint and a second vehicle-body-side rear joint provided at tip parts of the second arm main part so as to be swingably joined to the vehicle body frame at positions separate from each other in the front-rear direction. The upper arm is swingably joined to the knuckle such that at least part of the second vehicle-body-side rear joint is overlapped with the first vehicle-body-side rear joint in plan view and the second vehicle-body-side front joint is offset to a rear side relative to the first vehicle-body-side front joint. Moreover, the cushion unit disposed on a front side of the second arm main part is provided between the vehicle body frame and the lower arm.

Accordingly, the arm main parts of the lower arm and the upper arm are formed to bend in the U-shape, with their cross-sectional shapes set to a closed section. Thus, the structure can be simplified and the weight can be reduced with prevention of stress concentration on the lower arm and the upper arm. In addition, the first vehicle-body-side rear joint in the first vehicle-body-side front joint and the first vehicle-body-side rear joint, which the lower arm has at positions separate from each other in the front-rear direction so as to be swingably joined to the vehicle body frame, and the second vehicle-body-side rear joint in the second vehicle-body-side front joint and the second vehicle-body-side rear joint, which the upper arm has at positions separate from each other in the front-rear direction so as to be swingably joined to the vehicle body frame, are disposed to exist at the same position in the vehicle front-rear direction. This can prevent increase in the size of the vehicle body rear part. Furthermore, the second vehicle-body-side front joint of the upper arm is disposed on the rear side relative to the first vehicle-body-side front joint of the lower arm. Thus, the space for disposing the cushion unit linking the vehicle body frame and the lower arm can be easily ensured.

In further accordance with the present invention, the first arm main part of the lower arm is formed by bending a single pipe material whose cross-sectional shape is set to an angular shape and the second arm main part of the upper arm is formed by bending a single pipe material whose cross-sectional shape is set to a circular shape.

Accordingly, by setting the cross-sectional shape of the first arm main part of the lower arm to the angular shape, the reaction force from the road surface can be efficiently transmitted to the cushion unit. Furthermore, by setting the cross-sectional shape of the second arm main part of the upper arm to the circular shape, a clearance shape for ensuring the placement space of the cushion unit can be easily formed in the second arm main part, which can achieve improvement in the productivity.

In further accordance with the present invention, the second curvature peak of the upper arm is disposed on a rear side relative to the first curvature peak of the lower arm in plan view and the second vehicle-body-side front joint of the upper arm is disposed on a front side relative to the first curvature peak of the lower arm.

Accordingly, the second curvature peak of the upper arm opposed to the knuckle is disposed on the rear side relative to the first curvature peak of the lower arm opposed to the knuckle. In addition, the second vehicle-body-side front joint, which is the front-side joint in the joints of the upper arm to the vehicle body frame, is disposed on the front side relative to the first curvature peak of the lower arm. Therefore, a wide placement space of the cushion unit can be ensured by bending the upper arm to allow the cushion unit to be disposed, and the size of the independent suspension system of the drive wheel can be further reduced.

In further accordance with the present invention, the lower arm excluding a bracket provided to be joined to the cushion unit and the upper arm are so formed as to be allowed to be used for the drive wheels disposed on left and right sides of the vehicle body frame through reversing of upper and lower sides of the lower arm and the upper arm.

Accordingly, the lower arm excluding the bracket, i.e. most part of the lower arm, and the upper arm can be used for the left and right drive wheels through reversing of the upper and lower sides. Therefore, improvement in the productivity and cost reduction can be achieved through the common use of the components.

In further accordance with the present invention, the first arm main part of the lower arm is formed of an angular pipe material having a rectangular shape long in upward-downward direction as the cross-sectional shape.

Accordingly, by setting the cross-sectional shape of the first arm main part of the lower arm to the rectangular shape long in the upward-downward direction, forming the first arm main part with bending into the U-shape is made easy. In addition, bending stress with respect to a load in the upward-downward direction can be decreased and further size reduction can be achieved.

BRIEF DESCRIPTION OF THE DRAWINGS

These and further features of the invention will be apparent with reference to the following description and drawings, wherein:

FIG. 6 is a sectional view along line 6-6 in FIG. 5.

FIG. 7 is a plan view showing a state in which the vehicle body frame is omitted from FIG. 5.

DETAILED DESCRIPTION OF THE INVENTION

An embodiment of the present invention will be described with reference to the accompanying drawings. In the following description, front, rear, left, right, upward, and downward directions refer to the directions as viewed from an occupant riding a rough-terrain four-wheel drive vehicle.

Figure 1:
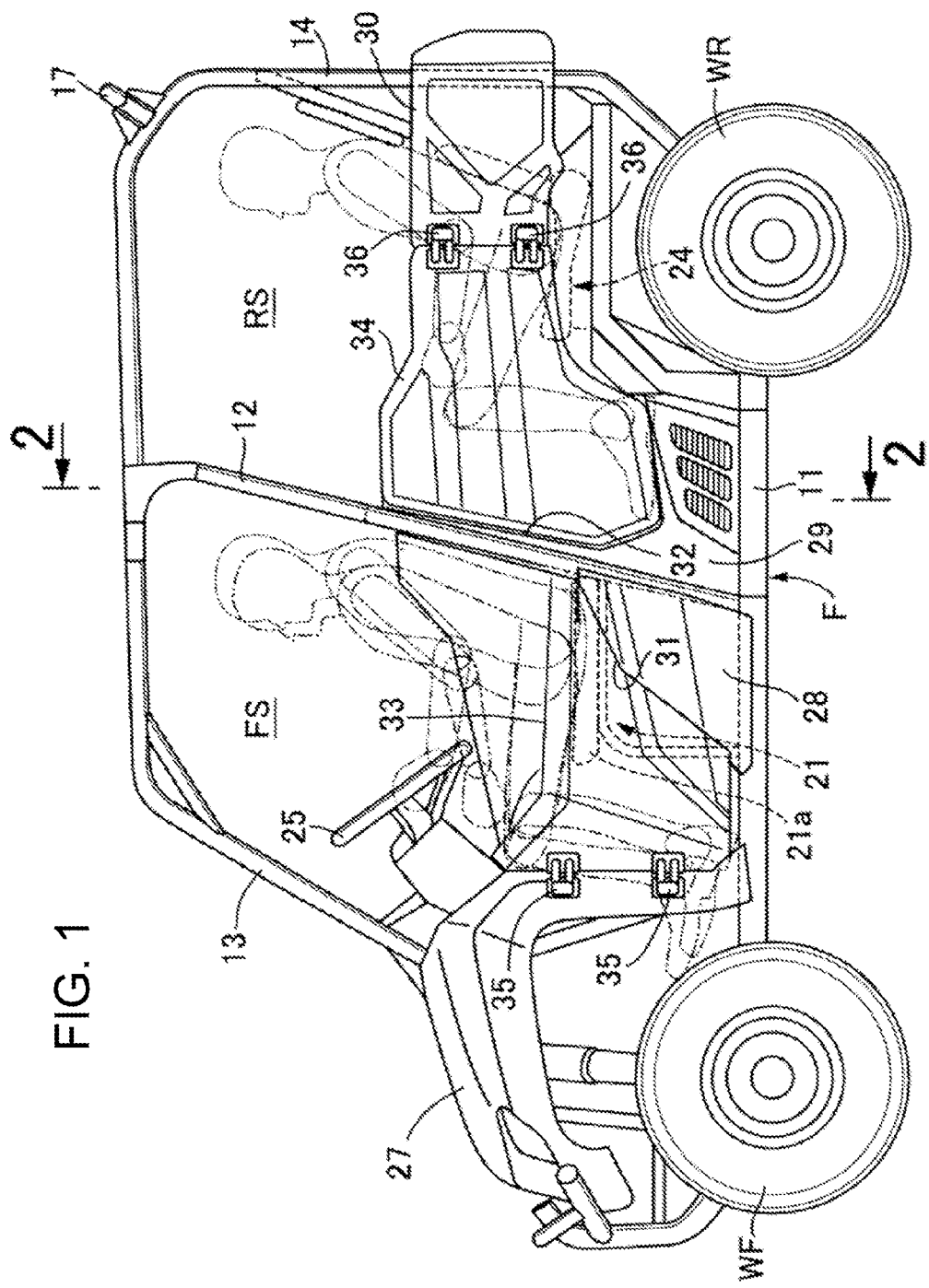
FIG. 1 is a side view of a rough-terrain four-wheel drive vehicle.
Figure 2:
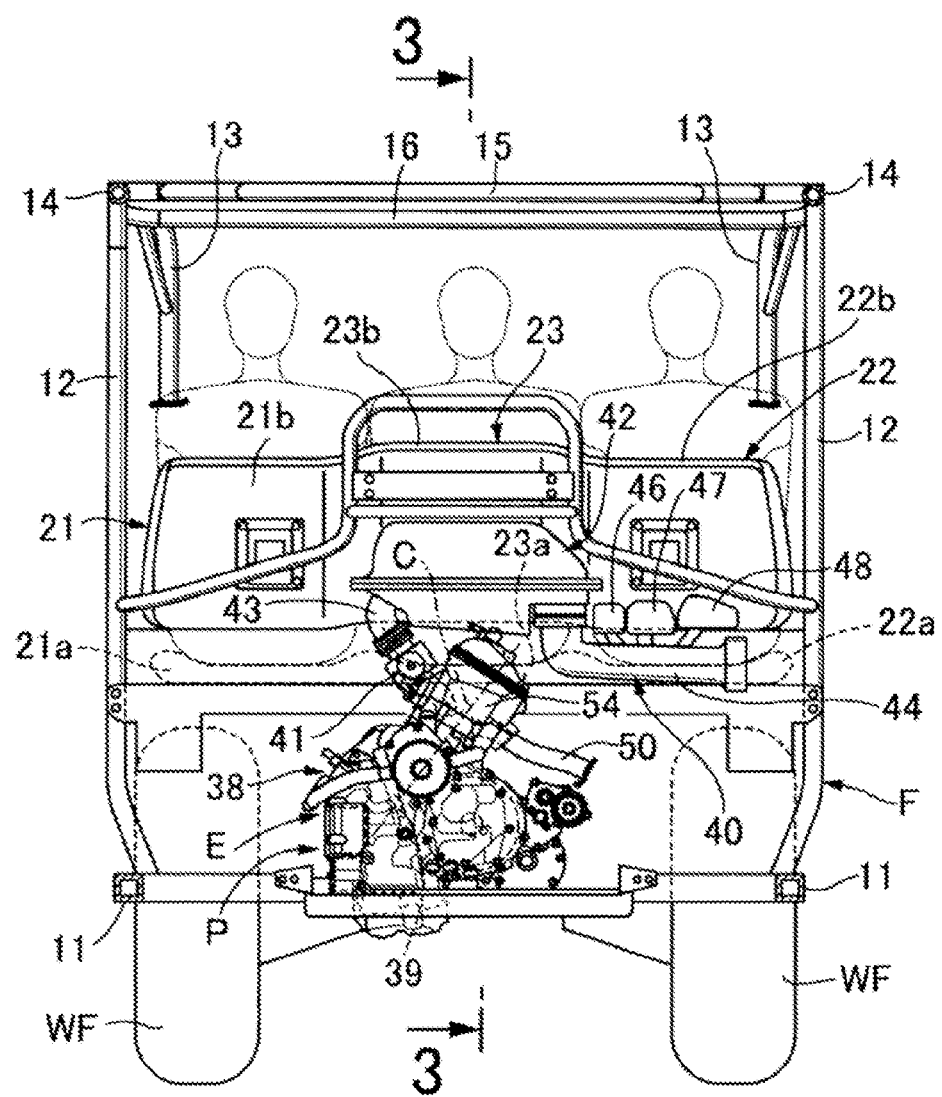
FIG. 2 is a sectional view along line 2-2 in FIG. 1.
Figure 3:
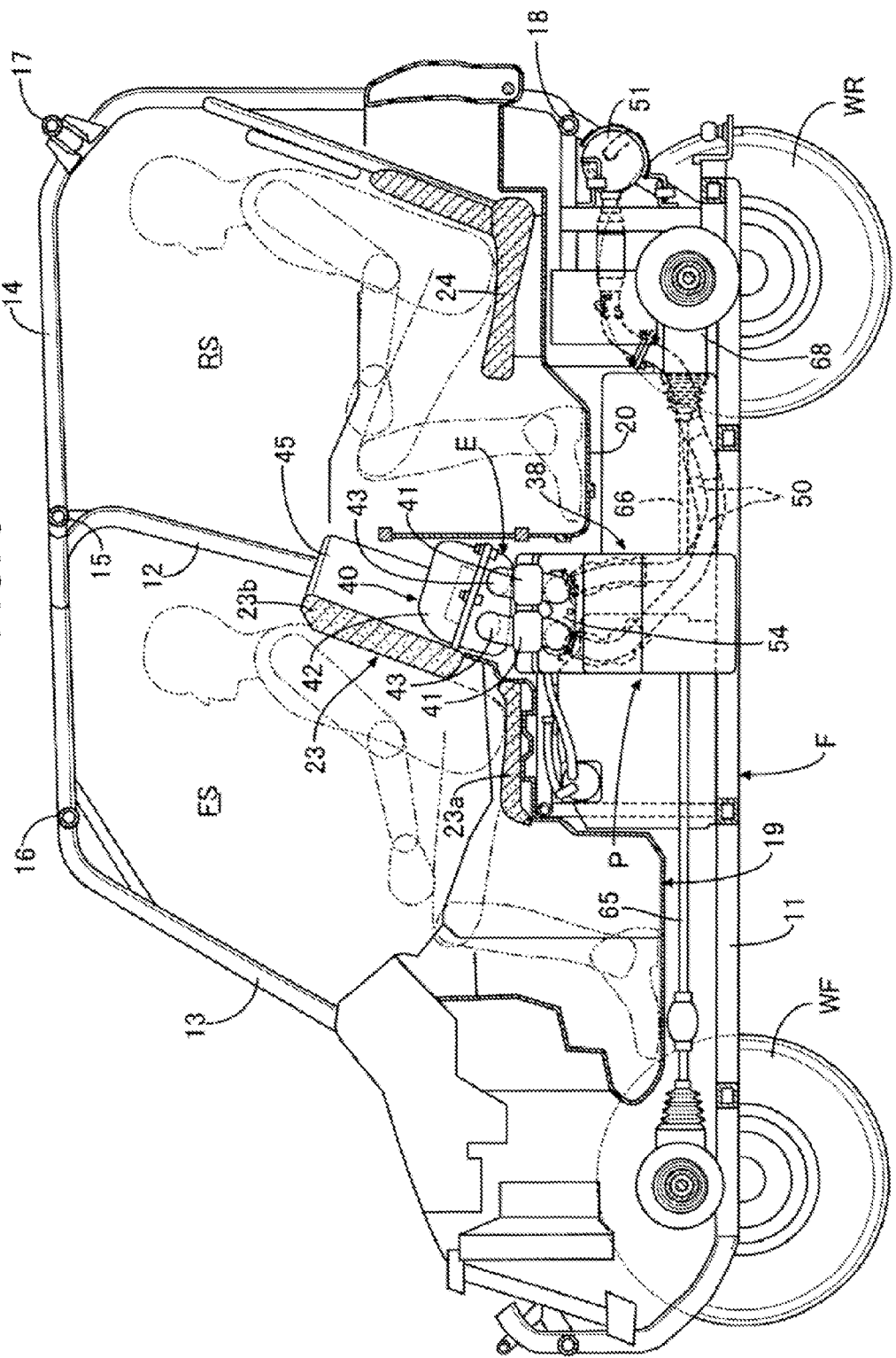
FIG. 3 is a sectional view along line 3-3 in FIG. 2.

Referring first to FIGS. 1 to 3, left and right front wheels WF are suspended at the front part of a vehicle body frame F of a rough-terrain four-wheel drive car as a four-wheel vehicle, and left and right rear wheels WR are suspended at the rear part of the vehicle body frame F.

The vehicle body frame F includes the following parts: left and right lower frames 11 extending along the front-rear direction; left and right center standing frames 12 that extend upward from the intermediate parts of the lower frames 11 in the front-rear direction; left and right front side frames 13 that extend forward from the upper ends of the center standing frames 12 and extend toward the front lower side from the middle to be made consecutive with the front parts of the lower frames 11; and left and right rear side frames 14 that extend rearward from the upper ends of the center standing frames 12 and extend downward from the middle to be made consecutive with the rear parts of the lower frames 11. The vehicle body frame F further includes the following parts: a center cross member 15 that links the upper end parts of the left and right center standing frames 12; a front cross member 16 that links the intermediate bent parts of the left and right front side frames 13; an upper rear cross member 17 that links the intermediate bent parts of the left and right rear side frames 14; and a lower rear cross member 18 that links the lower parts of the left and right rear side frames 14.

The left and right center standing frames 12 and the left and right front side frames 13 form the outer framework of a front riding space FS for driver and assistant drivers, and a front floor 19 that allows driver and assistant drivers to ride thereon and is disposed on the front side of the center standing frames 12 is supported by the front part of the vehicle body frame F. The left and right center standing frames 12 and the left and right rear side frames 14 form the outer framework of a rear riding space RS for fellow passengers, and a rear floor 20 that allows fellow passengers to ride thereon and is disposed on the rear side of the center standing frames 12 is supported by the rear part of the vehicle body frame F.

In the front riding space FS for driver and assistant drivers, a driver's seat 21 disposed on the rear side of a steering handle 25 to steer the left and right front wheels WF and an assistant driver's seat 22 disposed on one of the left and right sides (on the right, in this embodiment) of the driver's seat 21 are disposed separately from each other in the vehicle width direction.

The driver's seat 21 and the assistant driver's seat 22 have sitting parts 21a and 22a and backrest parts 21b and 22b extending upward from the rear parts of the sitting parts 21a and 22a, respectively. Furthermore, a second assistant driver's seat 23 is provided between the driver's seat 21 and the assistant driver's seat 22. The second assistant driver's seat 23 has a backrest part 23b displaced forward relative to the backrest parts 21b and 22b of the driver's seat 21 and the assistant driver's seat 22 and has a sitting part 23a disposed between the sitting parts 21a and 22a of the driver's seat 21 and the assistant driver's seat 22. On the other hand, in the rear riding space RS for fellow passengers, left and right passenger's seats 24 are provided.

The front part of the vehicle body frame F is covered by a front cover 27. Furthermore, the following covers are attached to the vehicle body frame F: front side covers 28 that cover the rear lower part of the front riding space FS from the lateral sides; left and right center side covers 29 that cover the front lower part of the rear riding space RS from the lateral sides; and left and right rear side covers 30 that cover the rear lower part of the rear riding space RS from the lateral sides. At the left and right rear parts of the front cover 27, left and right front doors 33 that can open and close front doorways 31 each formed between the front side cover 28 and the front cover 27 are pivotally supported by upper and lower hinge parts 35. At the front parts of the rear side covers 30, rear doors 34 that can open and close rear doorways 32 each formed between the center side cover 29 and the rear side cover 30 are pivotally supported by upper and lower hinge parts 36.

A two-cylinder internal combustion engine E that exerts power to rotationally drive the left and right front wheels WF and the left and right rear wheels WR is mounted on the vehicle body frame F to be disposed at substantially the center of the vehicle in the front-rear direction in plan view. An engine main body 38 of this internal combustion engine E is mounted on the vehicle body frame F on the basis of a longitudinal-engine structure in which the axis line of a crankshaft 39 is set along the front-rear direction with such a posture that a cylinder axis line C is inclined toward the assistant driver's seat 22 in the vehicle width direction. The engine main body 38 is disposed below the driver's seat 21 and the assistant driver's seat 22 at the center in the vehicle width direction.

Referring to FIGS. 2 and 3, an intake system 40 of the internal combustion engine E includes the following components: throttle bodies 41 connected to a cylinder head 54 of the engine main body 38 on each cylinder basis; an air cleaner 42 disposed between the driver's seat 21 and the assistant driver's seat 22 in plan view; connecting tubes 43 that link the throttle bodies 41 and the air cleaner 42; and a single intake duct 44 that guides air into the air cleaner 42.

The backrest part 23*b* of the second assistant driver's seat 23 provided between the driver's seat 21 and the assistant driver's seat 22 is monolithically continuous with the backrest parts 21*b* and 22*b* of the driver's seat 21 and the assistant driver's seat 22 and is displaced forward relative to these backrest parts 21*b* and 22*b*. Thus, the backrest parts 21*b*, 22*b*, and 23*b* of the driver's seat 21, the assistant driver's seat 22, and the second assistant driver's seat 23 form a recess 45 that is dented toward the front side in plan view and the air cleaner 42 is disposed in the recess 45.

The downstream end of the intake duct 44 extending to the right part of the vehicle body on the rear side of the sitting part 22*a* of the assistant driver's seat 22 is connected to the right part of the air cleaner 42. Resonators 46, 47, and 48 are connected to plural places of this intake duct 44.

A pair of exhaust pipes 50 connected to a sidewall of the lower part of the cylinder head 54 of the engine main body 38 are disposed to extend along the vehicle width direction and along the rear edge of the vehicle body frame F and are connected to an exhaust muffler 51 supported by the vehicle body frame F.

In the middle of a powertrain between the crankshaft 39 of the internal combustion engine E and the front wheels WF and the rear wheels WR, which are both drive wheels, a powertrain system (not shown) that configures a power unit P with the internal combustion engine E is provided. This powertrain system is included in the engine main body 38 as a built-in system.

Output from the power unit P is transmitted to the left and right front wheels WF via a front-wheel propeller shaft 65 (see FIG. 3) extending along the front-rear direction and is transmitted to the left and right rear wheels WR via a rear-wheel propeller shaft 66 (see FIG. 3) extending along the front-rear direction. The front-wheel propeller shaft 65 and the rear-wheel propeller shaft 66 are disposed to pass through the right side of the engine main body 38.

Figure 4:
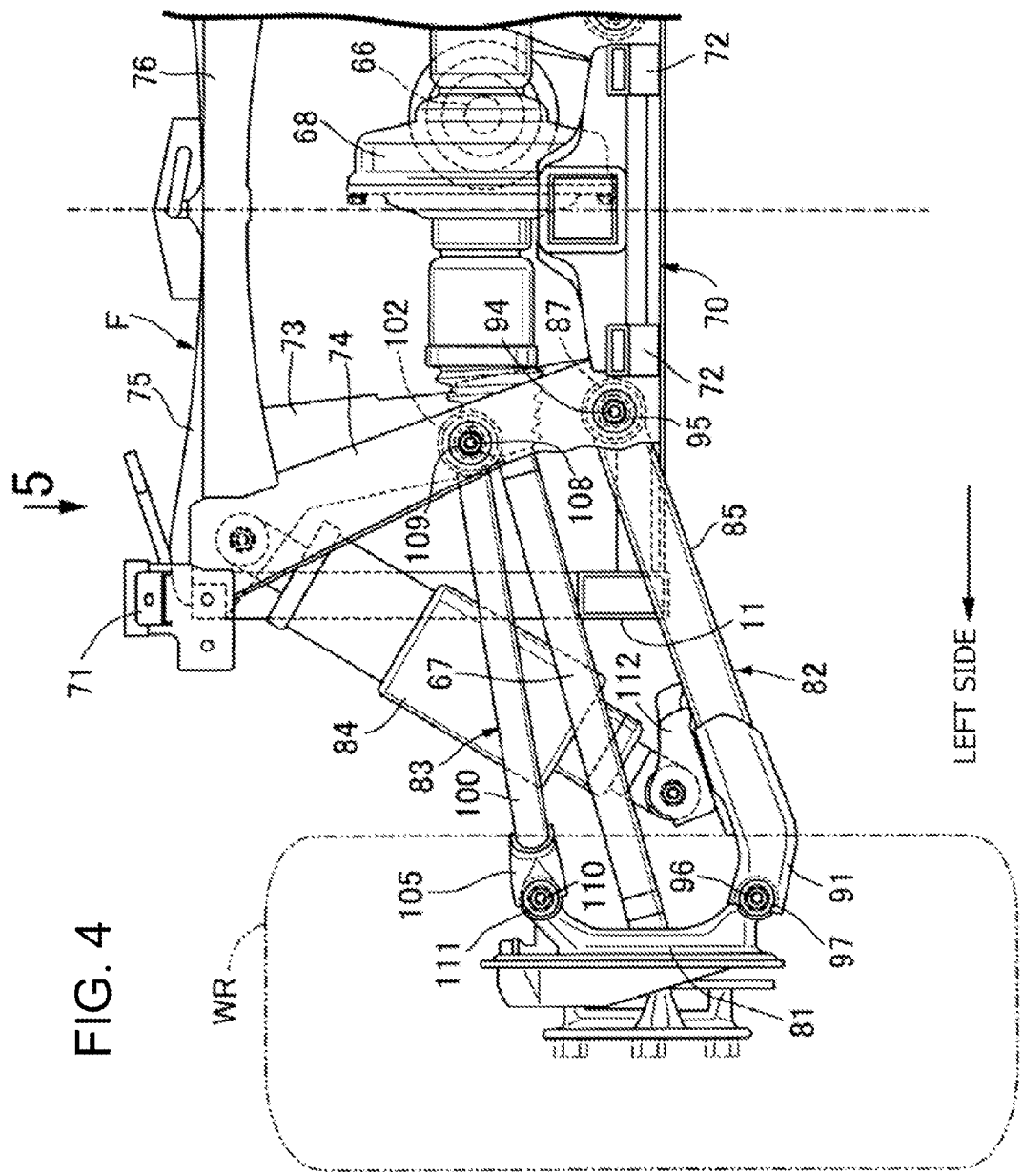
FIG. 4 is a diagram of part of a vehicle body frame and a suspension system of a left rear wheel as viewed from the vehicle rear side.
Figure 5:
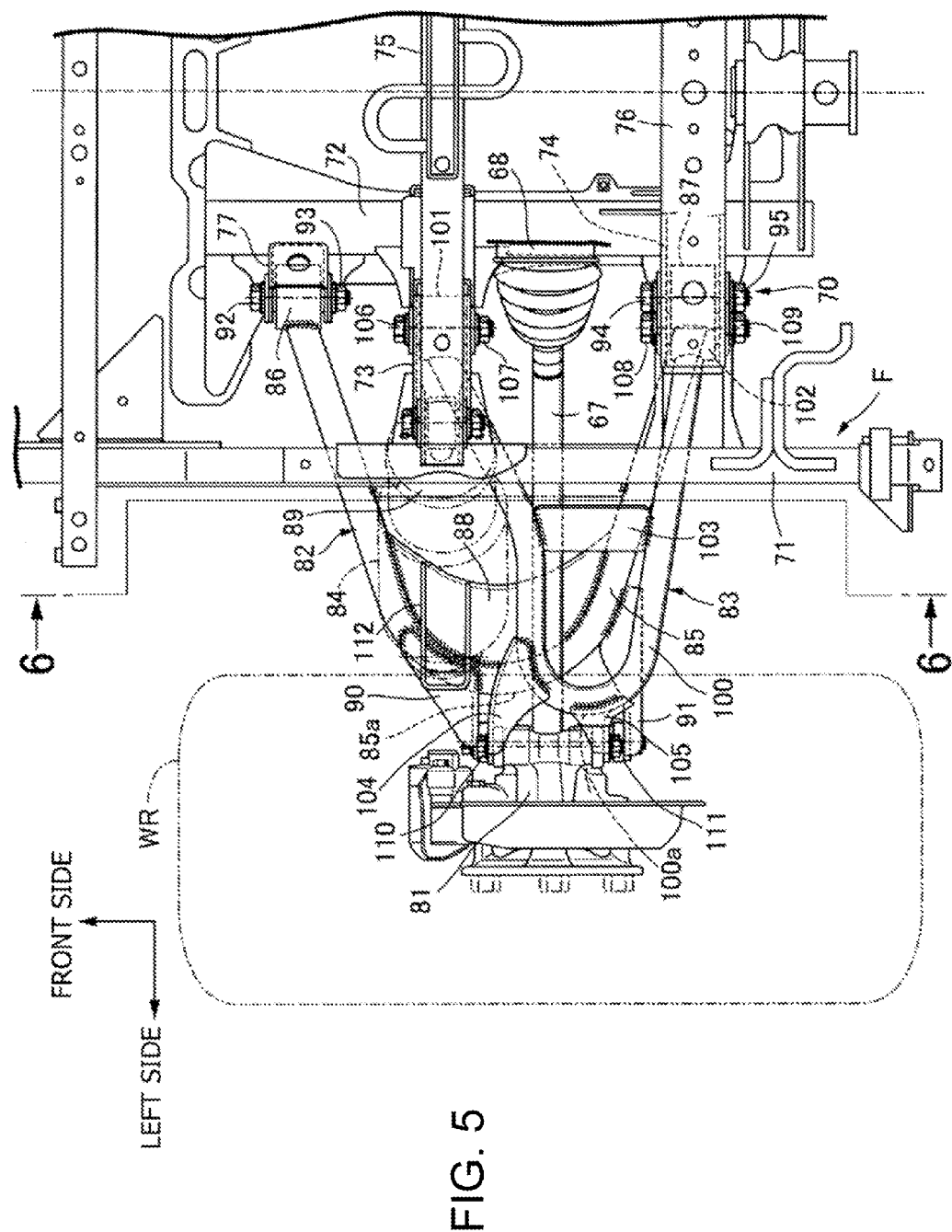
FIG. 5 is a diagram as viewed in a direction of an arrow 5 in FIG. 4.

In FIGS. 4 to 6, the vehicle body frame F has a rear frame 70 that forms part of the vehicle body frame F and is disposed at the rear part of the vehicle body frame F. This rear frame 70 includes the following parts: left and right upper frames 71 that are disposed above the left and right lower frames 11 and extend along the front-rear direction; left and right lower frames 72 that are disposed inside the upper frames 71 in the vehicle width direction in plan view and extend along the vehicle front-rear direction; and left and right front vertical frames 73 that are each inclined to be located closer to the outside in the vehicle width direction when the position thereof is closer to the upper side and each link the intermediate part of the lower frame 72 in the front-rear direction and the upper frame 71. This rear frame 70 further includes the following parts: left and right rear vertical frames 74 that are each inclined to be located closer to the outside in the vehicle width direction when the position thereof is closer to the upper side and each link the rear part of the lower frame 72 and the upper frame 71; an upper front cross member 75 that links the left and right front vertical frames 73; and an upper rear cross member 76 that links the upper parts of the left and right rear vertical frames 74. The front vertical frames 73 and the rear vertical frames 74 each have a substantially U-shape opened to the outside in the vehicle width direction as the cross-sectional shape.

The rear-wheel propeller shaft 66 is joined to a drive shaft 67 continuous with the left and right rear wheels WR with the intermediary of a differential mechanism 68. This differential mechanism 68 is supported by the rear frame 70.

Referring also to FIG. 7 in conjunction, the left rear wheel WR is vertically swingably supported by the rear frame 70 of the vehicle body frame F with the intermediary of a lower arm 82 and an upper arm 83 disposed above the lower arm 82, and a cushion unit 84 is provided between the rear frame 70 and the lower arm 82.

The lower arm 82 is configured to have the following parts: a first arm main part 85 that bends into a U-shape in plan view with a first curvature peak 85*a* oriented toward the rear wheel WR and has a closed section as the cross-sectional shape; and a first vehicle-body-side front joint 86 and a first vehicle-body-side rear joint 87 provided at the tip parts of the first arm main part 85 so as to be swingably joined to the rear frame 70 at positions separate from each other in the front-rear direction. The lower arm 82 further has the following parts: a reinforcing plate part 88 that reinforces the curving part of the first arm main part 85 on the side of the rear wheel WR; a reinforcing plate part 89 that reinforces the intermediate part of the first arm main part 85 in the vehicle width direction; and joining arm parts 90 and 91 provided at positions so as to sandwich the first curvature peak 85*a* of the first arm main part 85 from the front and rear sides.

The first arm main part 85 is formed by bending a single pipe material whose cross-sectional shape is set to an angular shape. In particular, as clearly shown in FIG. 6, the first arm main part 85 is formed of an angular pipe material having a rectangular shape long in the upward-downward direction as the cross-sectional shape. The first vehicle-body-side front joint 86 and the first vehicle-body-side rear joint 87 are each made by welding a short circular cylindrical body to the tip part of the first arm main part 85. The reinforcing plate parts 88 and 89 and the joining arm parts 90 and 91 are also each made by welding a member different from the first arm main part 85 to the first arm main part 85.

The first vehicle-body-side front joint 86 is pivotally joined to a bracket 77 provided on the lower frame 72 on the front side relative to the front vertical frame 73 by a bolt 92 and a nut 93 having the axis line along the front-rear direction. The first vehicle-body-side rear joint 87 is pivotally joined to the lower part of the rear vertical frame 74 by a bolt 94 and a nut 95 having the axis line along the front-rear direction. The joining arm parts 90 and 91 of the lower arm 82 are pivotally joined to a knuckle 81 that pivotally supports the rear wheel WR by a bolt 96 and a nut 97 having the axis line along the front-rear direction.

The upper arm 83 is configured to have the following parts: a second arm main part 100 that bends into a U-shape in plan view with a second curvature peak 100*a* oriented toward the rear wheel WR and has a closed section as the cross-sectional shape; and a second vehicle-body-side front joint 101 and a second vehicle-body-side rear joint 102 provided at the tip parts of the second arm main part 100 so as to be swingably joined to the rear frame 70 at positions separate from each other in the front-rear direction. The upper arm 83 further has a reinforcing plate part 103 that reinforces the intermediate part of the second arm main part 100 in the vehicle width direction and joining arm parts 104 and 105 provided at such positions as to sandwich the second curvature peak 100*a* of the second arm main part 100 from the front and rear sides.

The second arm main part 100 is formed by bending a single pipe material whose cross-sectional shape is set to a circular shape. The second vehicle-body-side front joint 101 and the second vehicle-body-side rear joint 102 are each made by welding a short circular cylindrical body to the tip part of the second arm main part 100. The reinforcing plate part 103 and the joining arm parts 104 and 105 are also each made by welding a member different from the second arm main part 100 to the second arm main part 100.

The second vehicle-body-side front joint 101 is pivotally joined to the intermediate part of the front vertical frame 73 in the upward-downward direction by a bolt 106 and a nut 107 having the axis line along the front-rear direction. On the other hand, the first vehicle-body-side front joint 86 of the lower arm 82 is pivotally joined to the bracket 77 on the front side relative to the front vertical frame 73. Thus, the second vehicle-body-side front joint 101 is offset to the rear side relative to the first vehicle-body-side front joint 86.

The second vehicle-body-side rear joint 102 is pivotally joined to the intermediate part of the rear vertical frame 74 in the upward-downward direction by a bolt 108 and a nut 109 having the axis line along the front-rear direction. On the other hand, the first vehicle-body-side rear joint 87 of the lower arm 82 is pivotally joined to the lower part of the rear vertical frame 74. Thus, at least part of the second vehicle-body-side rear joint 102 overlaps with the first vehicle-body-side rear joint 87 in plan view. Because the rear vertical frame 74 is formed to be located closer to the outside in the vehicle width direction when the position thereof is closer to the upper side, part of the second vehicle-body-side rear joint 102 overlaps with the first vehicle-body-side rear joint 87 in plan view.

The joining arm parts 104 and 105 of the lower arm 82 are pivotally joined to the knuckle 81 by a bolt 110 and a nut 111 having the axis line along the front-rear direction.

In addition, as clearly shown in FIGS. 5 and 7, the second curvature peak 100a of the upper arm 83 is disposed on the rear side relative to the first curvature peak 85a of the lower arm 82 in plan view, and the front side of the intermediate part of the second arm main part 100 in the upper arm 83 is formed with bending so that the second vehicle-body-side front joint 101 of the upper arm 83 may be disposed on the front side relative to the first curvature peak 85a of the lower arm 82.

The cushion unit 84 is provided between the rear frame 70 of the vehicle body frame F and the lower arm 82 so as to be disposed on the front side of the second arm main part 100 in the upper arm 83. The lower end part of the cushion unit 84 is joined to a bracket 112 provided on the reinforcing plate part 88 of the lower arm 82 by welding or the like and the upper end part of the cushion unit 84 is joined to the upper part of the front vertical frame 73.

In addition, the lower arm 82 excluding the bracket 112 and the upper arm 83 are so formed as to be allowed to be used for the left and right rear wheels WR through reversing of the upper and lower sides of these arms 82 and 83.

Next, the operation of this embodiment will be described. The lower arm 82 having the first arm main part 85 that bends into a U-shape in plan view with the first curvature peak 85a oriented toward the rear wheel WR and has a closed section as the cross-sectional shape and the first vehicle-body-side front joint 86 and the first vehicle-body-side rear joint 87 provided at the tip parts of the first arm main part 85 so as to be swingably joined to the vehicle body frame F at positions separate from each other in the front-rear direction is swingably joined to the knuckle 81 that pivotally supports the rear wheel WR. Furthermore, the upper arm 83 having the second arm main part 100 that bends into a U-shape in plan view with the second curvature peak 100a oriented toward the rear wheel WR and has a closed section as the cross-sectional shape and the second vehicle-body-side front joint 101 and the second vehicle-body-side rear joint 102 provided at the tip parts of the second arm main part 100 so as to be swingably joined to the vehicle body frame F at positions separate from each other in the front-rear direction is swingably joined to the knuckle 81. Thus, the structure can be simplified and the weight can be reduced with prevention of stress concentration on the lower arm 82 and the upper arm 83.

In addition, at least part of the second vehicle-body-side rear joint 102 is overlapped with the first vehicle-body-side rear joint 87 in plan view. This can prevent increase in the size of the vehicle body rear part. Furthermore, the second vehicle-body-side front joint 101 is offset to the rear side relative to the first vehicle-body-side front joint 86 and the cushion unit 84 disposed on the front side of the second arm main part 100 is provided between the vehicle body frame F and the lower arm 82. Thus, the space for disposing the cushion unit 84 linking the vehicle body frame F and the lower arm 82 can be easily ensured.

Furthermore, the first arm main part 85 of the lower arm 82 is formed by bending a single pipe material whose cross-sectional shape is set to an angular shape and the second arm main part 100 of the upper arm 83 is formed by bending a single pipe material whose cross-sectional shape is set to a circular shape. Therefore, the reaction force from the road surface can be efficiently transmitted to the cushion unit 84 and it is easy to form a clearance shape for ensuring the placement space of the cushion unit 84 in the second arm main part 100 of the upper arm 83, which can achieve improvement in the productivity.

In addition, the first arm main part 85 of the lower arm 82 is formed of an angular pipe material having a rectangular shape long in the upward-downward direction as the cross-sectional shape. This makes it easy to form the first arm main part 85 with bending into the U-shape. In addition, bending stress with respect to a load in the upward-downward direction can be decreased and further size reduction can be achieved.

Furthermore, the second curvature peak 100a of the upper arm 83 is disposed on the rear side relative to the first curvature peak 85a of the lower arm 82 in plan view and the second vehicle-body-side front joint 101 of the upper arm 83 is disposed on the front side relative to the first curvature peak 85a of the lower arm 82. Therefore, a wide placement space of the cushion unit 84 can be ensured by bending the upper arm 83 to allow the cushion unit 84 to be disposed, and the size of the independent suspension system of the rear wheel WR can be further reduced.

Moreover, the lower arm 82 excluding the bracket 112 provided to be joined to the cushion unit 84 and the upper arm 83 are so formed as to be allowed to be used for the rear wheels WR disposed on the left and right sides of the vehicle body frame F through reversing of the upper and lower sides of these arms 82 and 83. Therefore, improvement in the productivity and cost reduction can be achieved through the common use of the components.

Although the embodiment of the present invention is described above, the present invention is not limited to the above embodiment and various design changes can be made without departing from the present invention set forth in the scope of claims.

DESCRIPTION OF REFERENCE SYMBOLS

81 . . . Knuckle
82 . . . Lower arm
83 . . . Upper arm

84 . . . Cushion unit
85 . . . First arm main part
85a . . . First curvature peak
86 . . . First vehicle-body-side front joint
87 . . . First vehicle-body-side rear joint
100 . . . Second arm main part
100a . . . Second curvature peak
101 . . . Second vehicle-body-side front joint
102 . . . Second vehicle-body-side rear joint
112 . . . Bracket
F . . . Vehicle body frame
WR . . . Rear wheel as drive wheel

What is claimed is:

1. An independent suspension system of a drive wheel, wherein the drive wheel is vertically swingably supported by a vehicle body frame via the independent suspension system, said independent suspension system including a lower arm, an upper arm disposed over the lower arm, and a cushion unit, wherein
the lower arm has a first arm main part that forms a U-shape in plan view with a first curvature peak oriented toward the drive wheel and has a closed section as a cross-sectional shape and a first vehicle-body-side front joint and a first vehicle-body-side rear joint provided at tip parts of the first arm main part so as to be swingably joined to the vehicle body frame at positions separate from each other in a front-rear direction and swingably joined to a knuckle that pivotally supports the drive wheel,
the upper arm has a second arm main part that forms a U-shape in plan view with a second curvature peak oriented toward the drive wheel and has a closed section as a cross-sectional shape and a second vehicle-body-side front joint and a second vehicle-body-side rear joint provided at tip parts of the second arm main part so as to be swingably joined to the vehicle body frame at positions separate from each other in the front-rear direction and swingably joined to the knuckle such that at least part of the second vehicle-body-side rear joint is overlapped with the first vehicle-body-side rear joint in plan view and the second vehicle-body-side front joint is offset to a rear side relative to the first vehicle-body-side front joint, and
the cushion unit, which is disposed on a front side of the second arm main part in the front-rear direction, is provided between the vehicle body frame and the lower arm.

2. The independent suspension system according to claim 1, wherein
the first arm main part of the lower arm is formed by bending a single pipe material whose cross-sectional shape is set to an angular shape and the second arm main part of the upper arm is formed by bending a single pipe material whose cross-sectional shape is set to a circular shape.

3. The independent suspension system according to claim 2, wherein
the second curvature peak of the upper arm is disposed on a rear side relative to the first curvature peak of the lower arm in plan view and the second vehicle-body-side front joint of the upper arm is disposed on a front side relative to the first curvature peak of the lower arm.

4. The independent suspension system according to claim 3, wherein
the lower arm, excluding a bracket provided to be joined to the cushion unit and the upper arm, is formed so as to be allowed to be used for drive wheels disposed on left and right sides of the vehicle body frame through reversing of upper and lower sides of the lower arm and the upper arm.

5. The independent suspension system according to claim 4, wherein
the first arm main part of the lower arm is formed of an angular pipe material having a rectangular shape long in upward-downward direction as the cross-sectional shape.

6. The independent suspension system according to claim 3, wherein
the first arm main part of the lower arm is formed of an angular pipe material having a rectangular shape long in upward-downward direction as the cross-sectional shape.

7. The independent suspension system according to claim 2, wherein
the first arm main part of the lower arm is formed of an angular pipe material having a rectangular shape long in upward-downward direction as the cross-sectional shape.

8. An independent suspension system of a drive wheel, wherein the drive wheel is vertically swingably supported by a vehicle body frame via the independent suspension system, said independent suspension system including a lower arm, an upper arm disposed over the lower arm, and a cushion unit, wherein
the lower arm has a first arm main part that forms a U-shape in plan view with a first curvature peak oriented toward the drive wheel and has a closed section as a cross-sectional shape and a first vehicle-body-side front joint and a first vehicle-body-side rear joint provided at tip parts of the first arm main part so as to be swingably joined to the vehicle body frame at positions separate from each other in a front-rear direction and swingably joined to a knuckle that pivotally supports the drive wheel,
the upper arm has a second arm main part that forms a U-shape in plan view with a second curvature peak oriented toward the drive wheel and has a closed section as a cross-sectional shape and a second vehicle-body-side front joint and a second vehicle-body-side rear joint provided at tip parts of the second arm main part so as to be swingably joined to the vehicle body frame at positions separate from each other in the front-rear direction and swingably joined to the knuckle such that at least part of the second vehicle-body-side rear joint is overlapped with the first vehicle-body-side rear joint in plan view and the second vehicle-body-side front joint is offset to a rear side relative to the first vehicle-body-side front joint, and
the cushion unit, which is disposed on a front side of the second arm main part, is provided between the vehicle body frame and the lower arm,
wherein the second curvature peak of the upper arm is disposed on a rear side relative to the first curvature peak of the lower arm in plan view and the second vehicle-body-side front joint of the upper arm is disposed on a front side relative to the first curvature peak of the lower arm.

9. The independent suspension system according to claim 8, wherein
the first arm main part of the lower arm is formed by bending a single pipe material whose cross-sectional shape is set to an angular shape and the second arm main part of the upper arm is formed by bending a single pipe material whose cross-sectional shape is set to a circular shape.

10. The independent suspension system according to claim 9, wherein the first arm main part of the lower arm is formed of an angular pipe material having a rectangular shape long in upward-downward direction as the cross-sectional shape.

11. The independent suspension system according to claim 8, wherein the lower arm, excluding a bracket provided to be joined to the cushion unit and the upper arm, is formed so as to be allowed to be used for drive wheels disposed on left and right sides of the vehicle body frame through reversing of upper and lower sides of the lower arm and the upper arm.

* * * * *